United States Patent [19]
Phillips et al.

[11] Patent Number: 5,424,119
[45] Date of Patent: Jun. 13, 1995

[54] POLYMERIC SHEET HAVING ORIENTED MULTILAYER INTERFERENCE THIN FILM FLAKES THEREIN, PRODUCT USING THE SAME AND METHOD

[75] Inventors: Roger W. Phillips; Paul G. Coombs, both of Santa Rosa; Patrick K. Higgins, Windsor; Charles T. Markantes, Santa Rosa, all of Calif.

[73] Assignee: Flex Products, Inc., Santa Rosa, Calif.

[21] Appl. No.: 191,992

[22] Filed: Feb. 4, 1994

[51] Int. Cl.⁶ .................. B32B 5/16; B32B 15/04; B32B 7/00; B32B 33/00; B29C 47/00
[52] U.S. Cl. .................. 428/328; 428/329; 428/330; 428/331; 428/403; 428/404; 428/412; 428/480; 428/483; 428/113; 428/916; 264/176.1; 264/144; 264/132; 264/177.2; 264/108; 264/112

[58] Field of Search ............. 428/403, 328, 329, 330, 428/331, 404, 412, 480, 913, 483, 916; 264/176.1, 144, 132, 177.2, 108, 112

[56] References Cited

U.S. PATENT DOCUMENTS 5,135,812  4/1992  Phillips et al. .................. 428/403

Primary Examiner—P. C. Sluby
Attorney, Agent, or Firm—Flehr, Hohbach, Test, Albritton & Herbert; Harold C. Hohbach

[57] ABSTRACT

A polymeric sheet comprising a layer of polymeric material having a first and second parallel surfaces. A plurality of oriented multilayer interference thin film flakes are disposed in the layer of polymeric material. The flakes have first and second parallel surfaces and a width and a thickness and have an aspect ratio of at least 2:1 for the width with respect to the thickness.

39 Claims, 1 Drawing Sheet

POLYMERIC SHEET HAVING ORIENTED MULTILAYER INTERFERENCE THIN FILM FLAKES THEREIN, PRODUCT USING THE SAME AND METHOD

This invention relates to a polymeric sheet multilayer interference thin film having oriented flakes disposed therein, a product using the same and a method.

In U.S. Pat. No. 5,135,812, there is disclosed optically variable multilayer interference thin film flakes of various types and how such flakes can be incorporated into inks and paints. There is a need to find more uses for such flakes so as to broaden their application, as for example, encapsulating the same in plastic and in particular with extruded, coextruded and cast plastic sheets.

In general, it is an object of the present invention to provide a plastic sheet which has been extruded or cast and has oriented multilayer interference thin film flakes therein, a product using the same and a method.

Another object of the invention is to provide a plastic sheet of the above character which can be extruded or cast.

Another object of the invention is to provide a plastic sheet of the above character which the flakes are biaxially oriented.

Another object of the invention is to provide a plastic sheet of the above character in which the flakes are optically variable.

Another object of the invention is to provide a plastic sheet of the above character which can be manufactured in a conventional coextruder line.

Another object of the invention is to provide a plastic sheet of the above character which can be coated onto a plastic web serving as a substrate web with a weak bond between the plastic sheet and the plastic web.

Another object of the invention is to provide a plastic sheet of the above character which has a plastic substrate which can be white or colored.

Another object of the invention is to provide a plastic sheet of the above character in which flakes can be provided in one or more of the layers.

Another object of the invention is to provide a plastic sheet of the above character in which the flakes in different layers can have different colors.

Another object of the invention is to provide a plastic sheet of the above character in which the flakes are optically variable with a color shift in one layer which is different from the color shift in another layer.

Another object of the invention is to provide a plastic sheet of the above character in which additional colorants may be added to the optically variable flakes to modify the optical shift or to modify the colors produced.

Another object of the invention is to provide a plastic sheet of the above character which can be readily incorporated into other products.

Another object of the invention is to provide a plastic sheet of the above character which can be slit into narrow strips and incorporated as threads to be utilized in security papers such as bank notes.

Another object of the invention is to provide a plastic sheet of the above character in which relatively low amounts of flakes can be provided in the sheet while still achieving the desired optical effects.

Another object of the invention is to provide a plastic sheet of the above character which has smooth outer surfaces.

Another object of the invention is to provide a method for making the plastic sheet of the above character in which a mechanical flow is utilized to induce laminar flow orientation of the pigment flakes in the film optical product.

Another object of the invention is to provide a method of the above character which stabilizes the color characteristics of the flakes in the plastic sheet.

Additional objects and features of the invention will appear from the following description in which the preferred embodiments are set forth in detail in conjunction with the accompanying drawings.

In general, the polymeric sheet of the present invention is comprised of a layer of polymeric material having first and second parallel surfaces. A plurality of multilayer interference thin film flakes are disposed within the layer of polymeric material. The flakes have first and second spaced apart parallel surfaces and have a width and a thickness with an aspect ratio of at least 2:1 for the width with respect to the thickness. The flakes lie in planes with the first and second surfaces of the flakes being substantially parallel to the first and second surfaces of the layer of polymeric material.

Figure 1:
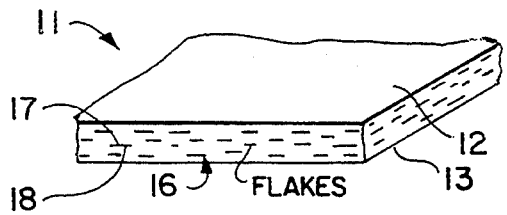
FIG. 1 is an isometric view partially in cross section of a polymeric sheet having oriented multilayer interference thin film flakes therein incorporating the present invention.

More specifically as shown in FIG. 1 of the drawings, the plastic or polymeric sheet 11 which has upper and lower planar spaced-apart parallel surfaces 12 and 13. The polymeric sheet 11 can be formed by casting or by extrusion. Also, as hereinafter described, it can be formed by coextruding films in which the sheet 11 forms one of the layers in the coextruded film.

The film forming the sheet 11 should have a thickness of at least two times the thickness of the multilayer interference thin film flakes which typically have a thickness of approximately 1 micron so that the sheet 11 should have a thickness of approximately two times the thickness of the flakes, or in other words, 2 microns if the flakes have a thickness of 1 micron.

In connection with the present invention, various types of polymers can be used, for example with an aqueous polymer, a polyvinyl alcohol, polyvinyl acetate polyvinylpyrrolidone, poly(ethoxyethylene), poly(methoxyethylene), poly(acrylic) acid, poly(acrylamide), poly(oxyethylene), poly(maleic anhydride), hydroxyethyl cellulose, cellulose acetate and poly(sacchrides) such as gum arabic and pectin may be used. If an organic solvent base is to be utilized, almost any polymer system that is dissolvable may be used. This may include those polymers listed in the aqueous examples above but will also include the additional polymers of poly(acetals), such as polyvinylbutyral, poly(vinyl halides), such as polyvinyl chloride and polyvinylene chloride, poly(dienes) such as polybutadiene, poly(alkenes) such as polyethylene, poly(acrylates) such as polymethyl acrylate, poly(methacrylates) such as poly methylmethacrylate, poly(carbonates) such as poly(oxycarbonyl oxyhexamethylene, poly(esters) such as polyethylene terephthalate, poly(urethanes), poly(siloxanes), poly(suphides), poly(sulphones), poly(vinylnitriles), poly(acrylonitriles), poly(styrene), poly(phenylenes) such as poly(2,5 dihydroxy-1,4-phenyleneethylene), poly(amides), natural rubbers, formaldahyde resins and other polymers listed in the *Polymer Handbook* (Second Edition), J. Brandrup, E. H. Emmergut, eds., John Wiley and Sons, N.Y., 1975 (pages IV-242).

A plurality of multilayer interference thin film flakes or platelets 16 are disposed in the sheet 11 between the top and bottom surfaces 12 and 13. The flakes 16 have upper and lower parallel surfaces 17 and 18 and have a maximum dimension or width along the surfaces 17 and 18 and a thickness measured in the direction perpendicular to the surfaces 17 and 18 so that the flakes have an aspect ratio of at least 2:1 with respect to the width versus the thickness. The flakes can be of a single color or can be optically variable. They can be manufactured in accordance with the teaching of U.S. Pat. No. 5,135,812. The optically variable pigments can be produced by all dielectric thin film layers or metal dielectric layers as described in U.S. Pat. No. 5,135,812.

The metal dielectric multilayer interference thin film coating making up the optically variable flakes can be in the form of an opaque metallic layer having first and second surfaces with a dielectric layer of a low index of refraction on each side of the first and second surfaces and a thin absorbing layer having an n/k ratio of near unity where n is the refractive index and k is the absorption constant. The low index material can be magnesium fluoride whereas the absorbed layer can be chromium. The thick substantially opaque metal layer can be formed of aluminum.

The pigment flakes 16 which are to be introduced into the polymeric sheet to be manufactured can be introduced into the dry polymer and mixed therewith immediately prior to being fed into the extruder hopper feed system. The amount of pigment flakes that can be added in the ratio desired and can range from more than 30% to less than 0.1% by weight with respect to the polymer. With the pigment flakes mixed therein, the polymer is heated to fully melt the same. The molten polymer with the pigment flakes therein is passed through a die which is extruded onto a cooled casting drum so that the molten polymer is quenched rapidly to an amorphous film. Typically the molten polymer is cooled from the melt temperature of about 275° C. to below 120° C. within 20 seconds.

A forward draw is then carried out for uniaxial orientation of the polymer by heating the film to its draw temperature, above 90° C. and stretching it between two sets of nip rollers, the second set running faster than the first set to cause stretching in one direction of the film to cause molecular chains within the film to align in the draw direction which in turn causes uniaxial orientation of the film. After, the film has been uniaxially oriented, it is passed through a sidewise draw to create biaxial orientation or orientation in a direction perpendicular to a uniaxial orientation. The sidewise draw is carried out in a conventional stentor (not shown) which preheats the film to 80°-90° C. and draws at a temperature ranging from 100°-120° C. by gripping the edges of the film as it is being drawn forwardly in the stentor. After the sidewise draw has been completed, the biaxially oriented film is passed through a conventional crystallization oven (not shown) having a temperature ranging from 200°-230° C. to firstly cause the film to become more crystalline with the molecular chains packing together in regular arrangements giving a density increase, secondly to cause the amorphous regions to relax and act as stress-relieving zones and thirdly to cause the crystalline regions to become disoriented out of the plane of the film. These changes give rise to identifiable properties of the film. The relaxation of strains plus the crystallization give a very dimensionally stable film.

It has been found in connection with the present invention that the biaxial orientation of the film has additional advantages with respect to orienting the pigment flakes 16 in the film. It has been found that when the film is going through the forward direction draw, the pigment flakes having their first and second surfaces 17 and 18 disposed perpendicular to the direction of the draw will be caused to tip over so that their first and second surfaces 17 and 18 lie in planes which are parallel to the first and second surfaces of the film. Similarly when the film is subjected to the sidewise draw, the pigment flakes 16 which have their surfaces lying in directions which are perpendicular to the direction of the sidewise draw will be tipped over so that their first and second surfaces 17 and 18 also lie in planes which are parallel to the first and second surfaces of the film 11.

The results of this biaxial orientation of the film 11 are shown in FIG. 1 in which as shown in cross section in FIG. 1 transverse of the film 11, the pigment flakes 16 lie in planes parallel to the surfaces 12 and 13 of the film. Similarly, looking in cross section longitudinal of the film as also shown in FIG. 1, the flakes 16 also lie in planes parallel to the surfaces 12 and 13 of the film.

It has been found that it is very important that this mechanical movement during biaxial orientation of the film causes the appropriate alignment of the pigment flakes in the film hereinbefore described and so that the flakes are disposed below the surfaces of the film to provide the film with smooth first and second surfaces 12 and 13. This mechanical movement during biaxial orientation is also desirable because the molten polymer is still viscous so that the flakes have difficulty in settling down into the viscous mass during forming of the film without the use of the mechanical stretching hereinbefore described. It also has been found that the thinner the film produced, the greater the likelihood that all or substantially all of the flakes 16 will be oriented properly. By way of example, a film 11 can have a thickness of 2–5 microns with the pigment flakes having a thickness of 1–2 microns.

The film 11 after it is passed through the crystallization oven can be cooled and then can be slit to desired widths by trimming off the edges and trimming the same to suitable sizes, as for example widths of 1–3 millimeters. The uses of the film shown in FIG. 1 will be described hereinafter in conjunction with the additional embodiments of the invention disclosed herein.

Figure 2:
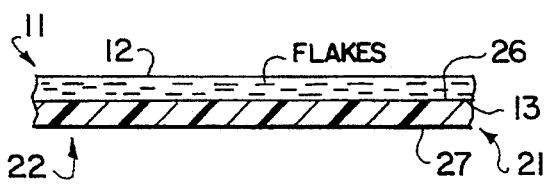
FIG. 2 is a cross-sectional view of a coextruded polymeric sheet incorporating the present invention carried by a plastic substrate.

When it is desired to provide additional support for the polymer sheet 11, a substrate or substrate layer 21 can be provided to form a composite structure 22 shown in FIG. 2. This substrate or substrate layer 21 has upper and lower spaced-apart parallel surfaces 26 and 27. This substrate or primary layer 21 can be formed from any synthetic, film-forming polymeric material. Suitable polymeric materials include thermoplastic materials.

This substrate layer or primary layer 21 may be biaxially oriented in the same manner as the film 11 to cause sequential biaxial stretching by stretching in the forward direction first and thereafter in a sidewise direction.

It should be appreciated in conjunction with the present invention that simultaneous biaxial orientation can be affected by extruding a thermoplastic polymeric tube which is subsequently quenched, reheated and then expanded by internal gas pressure to induce transverse orientation in one direction and to cause axial orientation in the opposite direction. This can be accomplished by withdrawing the polymeric tube at a rate which will induce longitudinal orientation at right angles to the first direction of orientation caused by the gas expansion.

It also should be appreciated that in conjunction with the present invention both the secondary layer 11 and primary layer 21 can be formed substantially simultaneously by simultaneous coextrusion of the respective film-forming layers through independent orifices of a multi-orifice die and thereafter uniting the still molten layers, or preferably by a single channel of coextrusion in which molten streams of the respective polymers are first united within a channel leading to a die manifold and thereafter extruded together from the die orifice under conditions of streamlined flow without intermixing thereby to produce a composite sheet. The coextruded sheet can be then stretched to effect molecular orientation in a forward direction of both layers simultaneously and thereafter sidewise stretched to produce the biaxial orientation of both layers and thereafter inducing partial crystallization of the secondary layer 11. In such cases it may be preferred to heat set under dimensional restraint at a temperature greater than the crystalline melting temperature of the secondary layer polymer and causing the film to cool to ensure that the secondary layer polymer remains essentially amorphous. The heat setting of a polymeric film comprising a polyester primary layer and a cold polyester secondary layer is typically effected at a temperature ranging from 200°–250° C. By providing an amorphous secondary layer 11, voiding around the pigment flakes during orientation is substantially eliminated or at least significantly reduced to provide improved optical properties for the film. Thus, as shown in FIG. 2, the secondary layer 11 containing the multilayer interference thin film flakes is provided on one surface, as for example on the top or first surface 26 of the substrate 21. By utilizing such a two layer arrangement it is possible to provide a layer 21 that is relatively thick and a layer 11 that is very thin with this thin or secondary layer containing the multilayer interference thin film flakes to make good use of the flakes since they are the expensive component of the layer. Thus, it is possible to obtain substantially total color saturation by having two or three layers of randomly dispersed flakes to (in effect) provide a continuous coating with a very thin layer thereby utilizing a small amount of material while still providing the desired color saturation.

In connection with providing the polymer sheet 11 as shown in FIG. 1, it should be appreciated that in addition to it being formed by extrusion as hereinbefore described, the sheet can be formed by casting, as for example through a conventional slot applicator. In casting, as with extrusion, the multilayer interference thin film flakes can be introduced and mixed with the solvent dissolved polymer and then passed through the slot applicator. This casting process also causes orientation of the flakes 16 so that they lie flat or in parallel planes with respect to the top and bottom surfaces 12 and 13 of the sheet 11.

The movement of the flakes or platelets 16 so that they lie on their wider sides is accomplished by three effects. In the solvent cast film, gravitational forces have a large impact on having the flakes 16 lie down on their wide sides. This lying down is enhanced by the surface tension which is created during drying of the cast film which is akin to the biaxial stretch hereinbefore described. With the surface tension effect, as the polymer dries and the solvent evaporates, the polymer tends to shrink and pull the flakes flat. In the direction of flow during the casting process, the flow will tend to orient the flakes along the direction of flow while permitting the flakes to settle under the force of gravity so that they will lie flat. If the polymer is a hot melt material, then the shear forces present at the coating slot die also cause the flakes to lie flat. Thus, it can be seen that the flakes are oriented in much the same manner as during biaxial stretching of an extruded film.

Figure 3:
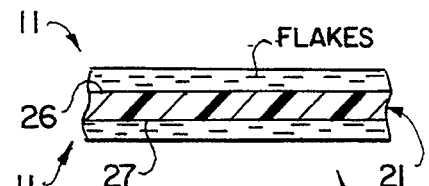
FIG. 3 is a cross-sectional view of a coextruded polymeric sheet incorporating the present invention having flakes in layers on opposite sides of a plastic substrate.

In the embodiment of the invention shown in FIG. 3, one of the layers 11 is also provided on the second surface 27 so that the same or a different color effect can be achieved on the other side of the substrate 21. The multilayer interference thin film flakes 16 of the present invention can be utilized to provide a pigment of a single color or one that is optically variable. Thus, the two different layers 11 on opposite sides of the substrate can have different colors or can have the same or different optically variable characteristics. In order to enhance the perception of color, the substrate 21 can be provided with a black dye or alternatively can be colored to achieve different color effects. Also it can be white.

Figure 4:
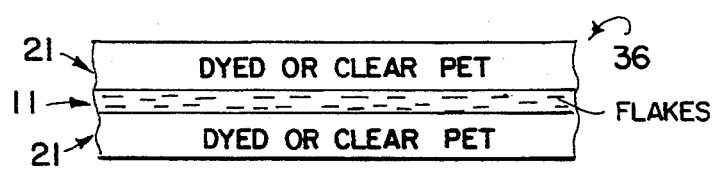
FIG. 4 is a cross-sectional view of a polymeric sheet having a substrate having flakes therein incorporating the present invention with plastic layers disposed on each side which can be clear or dyed with a color.

In FIG. 4 there is shown a composite structure 32 in which the center layer 11 is the layer carrying the flakes and the outer layers 21 are clear or dyed with a color to provided different or the same color effects on opposite sides of the layer 11.

The composite structures which are shown in FIGS. 3 and 4 can be coextruded in the manner hereinbefore described. It should be appreciated that if desired, additional layers can be provided which also can be simultaneously coextruded and biaxially stretched in the manner hereinbefore described.

A polymer sheet composite incorporating the present invention can range in thickness from 12–500 microns, 3–175 microns and preferably from 3–30 microns. By way of example, the secondary layers 11 can constitute from 1-50% and typically from 1-20% of the total composite thickness. The secondary layers 11 preferably have a thickness of up to 20 microns and more preferably from 0.5-10 microns.

The multilayer interference thin film flakes suitable for use as pigments in the layer 11 comprise multilayer optical coatings, typically of three and five layers and greater to produce strongly dichroic optical effects. By way of example, five layer optically variable flakes are preferably of a symmetrical design as described in U.S. Pat. No. 5,135,812 and are comprised a first thin semi-opaque metal layer followed in sequence by a first dielectric layer, a thick metal reflecting layer, a second layer of dielectric material and a second thin semi-opaque metal layer. The first semi-opaque metal layer and the dielectric layer are formed of an optical coating substructure which is an inverted version of the optical coating substructure of the second semi-opaque metal and dielectric layers. Each of the semi-opaque thin metal layers preferably comprise a nominal 5 nanometer thick layer of chromium. Each of the dielectric layers are formed from a dielectric material such as silicon dioxide or magnesium fluoride to form an optical thickness of a plurality of half waves at a particularly design wavelength. The thick metal reflecting layer may comprise a layer of aluminum formed to a thickness of about 40 or more nanometers to provide high opacity and high reflection. Alternatively, instead of using chromium for the semi-opaque metal layer, a material such as nickel and stainless steel can be utilized. Instead of silicon dioxide having an index or refraction of 1.46 for the dielectric layers, other inorganic materials having a refractive index of 1.65 or less such as magnesium fluoride (1.38) and aluminum oxide (1.65) also can be used. Instead of aluminum as the metal reflecting layer, materials such as gold, copper and silver as well as cobalt-nickel magnetic alloys may be used.

Three layer optically variable flakes similar in design to the five-layer structure can be used but the optical coating substructure of the second semi-opaque metal and dielectric layers can be eliminated. Furthermore, three-layer optical designs as described in U.S. Pat. No. 5,278,590 can be used as the interference flakes.

A preferred example of a five layer optically variable flake exhibits deep green and purple hues with changes of angle of incidence light. The deep green optically variable flake comprises a plurality of half waves for a silicon dioxide layer at a wavelength at approximately 515 nanometers. This produces an optically variable flake with a sixth order reflectance maximum at 515 nanometers. A narrow band reflectance spike with about 60% or greater reflectance at the 515 nanometer wavelength results with nearly zero reflectance at nearby wavelengths. Although fourth and eighth order reflectance maxima occur in the near infrared region and the short wavelength blue regions, the flake still produces a very saturated green color. Due to the low refractive index (1.46) of the silicon dioxide layer and its high order, a large amount of color shift occurs with changes in the viewing angle of the coating. At a viewing angle of about 45°, the sixth order peak shifts into the blue region, and the fourth order peak shifts downscale into the red, leaving a low reflectance in the 515 nanometer green region. Thus, the apparent color of the coating changes from a deep green to a purple as the angle of viewing increases.

A second preferred example of a five layer optically variable flake comprises a silicon dioxide layer of a plurality of half waves at about 450 nanometers. This coating had a fourth order reflectance peak in the red part of the spectrum and a sixth order peak in the blue part of the spectrum which produced a deep purple color when viewed at normal incidence. When viewed at larger angles, the fourth order peak moved into the green region with low reflectance in the blue and red. This causes the apparent color of the coating to shift from purple to green at large viewing angles.

Thus, typically the optically variable flakes utilized in the present invention for inclusion in the secondary layer or layer 11 of a polymeric film exhibit two distinct colors, one color when viewed in a direction normal to the surface of the flake and another color when viewed at a substantial angle such as 45° with respect to the surface of the flake. This dramatic color shift is achieved because of the use of at least one dielectrical layer having a low refractive index, preferably at 1.65 and below.

The flakes 16 suitable for use in the secondary layer or layer 11 of a polymeric film according to the present invention preferably have a particle size by which is meant the size of the maximum width of the flake of 0.5-200 microns, and preferably in the range of 1-20 microns. The mean particle size, i.e. the maximum width of the flakes, of the flakes is preferably, 1-20 microns.

The aspect ratio, by which is meant the ratio of the maximum width to the thickness, of the optical variable flakes is suitably greater than 2:1, preferably in the range of 5-10:1.

In order to obtain the advantageous properties of the present invention the concentration of the optically variable flakes present in the layer 11 was suitably in the range of 1-50% by weight and preferably 2-30% by weight with respect to the weight of the polymer in the layer 11.

In connection with the present invention it has been found that it is desirable to bake the pigment flakes at a relatively high temperature, as for example at 250° C. or above for a period of time ranging from 2-4 hours to make the pigment flakes more durable. Although it is not exactly understood what is occurring, it is believed that baking at a high temperature in air or in oxygen improves the durability of the flakes. Substantially the same effects are achieved by placing the pigment flakes in the polymeric film during extrusion of the same and during biaxial orientation of the polymeric film because of the high temperatures utilized.

Although in connection with the present invention it was described that the pigment flakes 16 could be added to the polymeric material prior to extrusion of the same, it should be appreciated that the flakes 16 if desired may be added during monomer transfer or in the autoclave. It has been found, however, that it is preferred to incorporate the flakes as a glycol dispersion during the esterification reaction stage of the polyester synthesis. Alternatively, the pigment flakes may be added directly to the polymer chip prior to extrusion. Thus, the flakes may be added as a dry powder into the polymer melt extruded therefrom.

The layers of film made in accordance with the present invention may contain any of the additives conventionally employed in the manufacture of polymeric films. Thus, agents such as dyes, pigments, lubricants, anti-oxidants, anti-blocking agents, surface active agents, ultra-violet light stabilizers, viscosity modifiers and dispersion stabilizers may be incorporated in the primary and/or secondary layer(s), as appropriate. In particular, the dichroic optical effects of the optically variable flakes can be combined with certain matching or contrasting dye colors and/or pigments added to the polymeric material of the secondary layer in order to produce other colors with other color-shifting effects. Transparent pigments and dyes can be used to block out unwanted colors, for example as disclosed in U.S. Pat. No. 5,135,812.

It should be appreciated that the composite construction herein disclosed can also be formed of materials which will seal onto themselves or alternatively additional layers can be provided so that sealing can be accomplished. It also should be appreciated that a polymeric film made in accordance with the present invention may be coated on one or both surfaces with one or more additional coatings such as ink, lacquer and/or metal layers to form a laminate or composite which exhibits improved properties, such as antistatic, adhesion promoting or release, compared with the component materials.

The biaxial orientation typically can be carried out by stretching in the forward and sideways directions in suitable amounts to accomplish the production of a film having the desired thickness. By way of example, one film was stretched 3.6 times its original dimension in the forward direction and 4.2 times its original dimension in a sideways or a transverse direction. The film composite was finally heat-set under dimensional restraint in a stentor oven at a temperature of about 225° C.

The biaxially oriented polymeric film optical product made in accordance with the present invention as hereinbefore described and having oriented multilayer interference thin film flakes therein can be utilized in many different products. Particularly novel and desirable color effects can be obtained which can be utilized for various decorative purposes. When the flakes are in the form of optically variable pigments, they are particularly useful in providing security capabilities in security documents such as bank notes, certificates, credit cards and security type identification documents, such as drivers licenses and the like. In order to eliminate the need for large quantities of the film, small portions of the polymeric film can be incorporated into the security documents. They also can be incorporated in labels or packaging of articles which may be subject to counterfeiting. The presence of even a small amount of the polymeric sheet in the security document makes it possible for one, as for example, a man on the street, to readily distinguish between a genuine article and a counterfeited article by observing the presence or absence of a color shift.

The security is provided because it would be very difficult if not impossible for a counterfeiter to replicate the multilayer interference thin film flakes because of the complex technology used therein. In addition it would require a huge capital expenditure to incorporate the same in a biaxially oriented polymer film to create the desired optical effects. In addition, the security documents cannot be copied on color copiers because the optically variable characteristics cannot be duplicated by the color copier.

Figure 5:
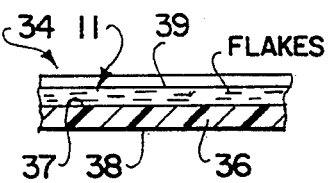
FIG. 5 is a cross sectional view of a polymeric sheet having a thick clear polymeric base upon which is a thin layer of polymeric material containing optically variable flakes plus additional materials such as dyes, pigments, aluminum flake, etc., with a clear overlacquer.

In FIG. 5 there is provided another composite polymeric sheet construction 34 in which the polymeric sheet is provided with a base or substrate 36 having upper and lower surfaces 37 and 38. The base substrate 36 in comparison to the substrate of the hereinbefore described embodiments can be relatively thick as for example from 5 mils to to ⅜ inch and can be clear. The center layer 11 provided on the surface 37 can be of the type hereinbefore described and can be in the form of a thin layer of polymeric material containing the optically variable flakes 16 hereinbefore described. In addition to the optical variable flakes, other materials such as dyes, pigments, aluminum flakes and the like can be incorporated into the layer 11. These dyes, pigments and the like can be used for various purposes well known to those skilled in the art. For example, they can bemused to block out an undesired color at various angles. They also can be used to subtract a color. An overlayer 39 can be provided over the layer 11 and can be formed of suitable relatively hard material such as a lacquer. Such a composite structure 34 as shown in FIG. 5 can be utilized in a number of applications as for example for flooring and other decorative effects.

Figure 6:
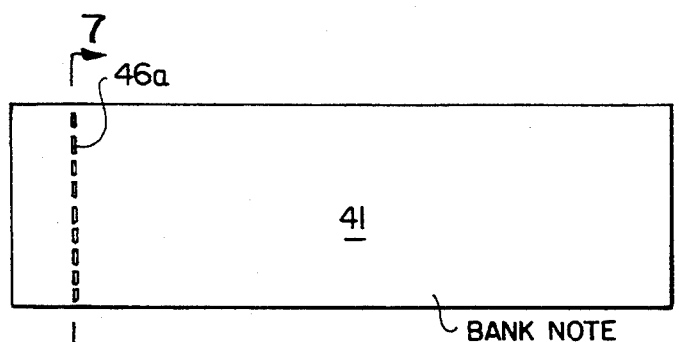
FIG. 6 is a plan view of a bank note having embedded therein a thread made from polymeric sheet incorporating the present invention visible on one side of the bank note.
Figure 7:
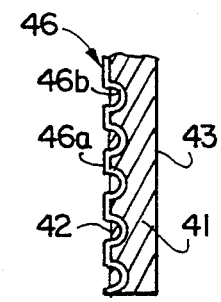
FIG. 7 is a cross-sectional view taken along the line 6—6 of FIG. 5.
Figure 8:
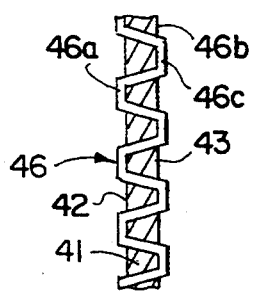
FIG. 8 is a view similar to FIG. 6 but showing the manner in which the thread is woven into the bank note so that it is visible on both sides of the bank note.

An example of the manner in which the invention can be practiced in utilizing the polymeric film of the present invention in a security document 41 is shown in FIG. 6 in which the security document is in the form of a sheet of material such as bank note formed of paper having a thickness ranging from 2–3 mils and having first and second surfaces 42 and 43 which are spaced apart and parallel with a thread 46 is at least partially embedded in the paper of the note. The thread 46 extends transversely across the note adjacent-one edge of the same as shown in FIG. 6 with spaced-apart portions 46a of the thread being exposed on one or the top surface 42 with intermediate portions 46b being embedded within the paper of the bank note as shown in FIG. 7. Alternatively, as shown in FIG. 8, the thread 46 can be embedded in the paper of the bank note by having spaced-apart portions 46a being visible from the surface 42, intermediate portions 46b being buried within the paper of the note and additional spaced-apart portions 46c visible from the other surface 43 of the bank note.

The thread 46 can be formed from the biaxially oriented polymeric sheet 11 or the cast film hereinbefore described by slitting the sheet 11 to appropriate widths, as for example 1.5–3 mils and with a thickness of 0.5 mil to provide an elongate strip serving as the thread 46. Such a thread would have a rectangular cross section. In accordance with the present invention, the thread could be incorporated into the bank note as shown in FIG. 6 to remove a one color or provide a one color or one optically variable effect from one side of the bank note. If it is incorporated into the bank note as shown in FIG. 7 so that portions of the same are visible on opposite sides of the note, two different color effects or optically variable effects can be achieved on opposite sides of the note. For example, a gold-to-green shifter could be incorporated on one side and a green-to-blue shifter could be incorporated on the other side. Alternatively, one side could just be a metalized reflector, as for example having aluminum flakes incorporated therein with the other side having an optically variable effect.

It should be appreciated in connection with the foregoing that other than the threads, small portions of the polymeric film of the present invention can be incorporated into the security documents to form an integral part thereof. Thus, such portions, can be utilized in credit cards, transit passes or any other value document.

Figure 9:
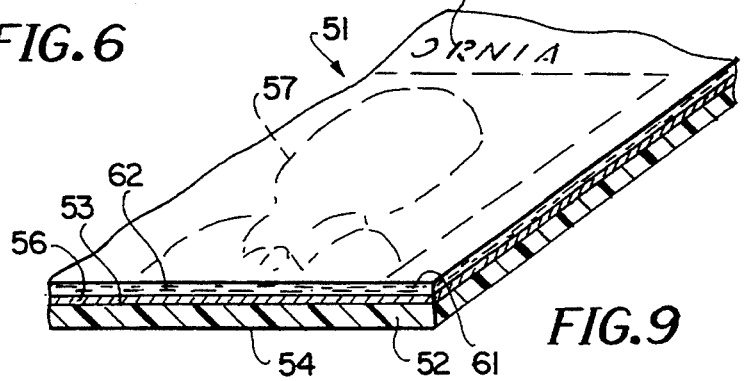
FIG. 9 is an isometric view partially in cross section of a security document incorporating a polymeric sheet of the present invention.

An example of a security document is shown in FIG. 9 which as shown therein can be in the form of a California driver's license 51 of a suitable size so that it can readily fit into a conventional billfold, as for example 2"×3¼". It is provided with a relatively rigid substrate 52 formed of a suitable plastic of the type hereinbefore described. It can have a suitable thickness, as for example 2-10 mils, It has upper and lower planar spaced-apart parallel surfaces 53 and 54. A sheet 56 of a suitable material such as paper; can be laminated to the surface 53 by the application of heat and pressure and the use of an adhesive (not shown). The sheet 56 depending upon the application for the security document can carry a picture or a photograph 57 and printed information 58 as shown in FIG. 8. The photograph, by example may be a color photograph and the printed information can be in different colors. In such an application, the sheet 56 can be opaque. However, it should be appreciated that if desired, the sheet 56 can be formed of a semi-transparent material.

A polymer sheet 61 incorporating the present invention is adhered to the sheet 56 by laminating it thereto by the use-of a clear adhesive (not shown) and by the application of suitable heat and pressure to complete the security document. The polymer sheet contains multi-layer interference thin film flakes 62 of the type hereinbefore described. By way of example, the polymer sheet 61 in this application can be-relatively thin, as for example 2-3 microns. The flakes can be in relatively low concentration, as for example in the lower ranges hereinbefore set forth so that the polymer sheet 61 is semi-transparent to permit viewing of the information on the sheet 56, as for example the photograph 57 and the printed information 58 by the human eye. The flakes 62, in such an application can be of the optically variable type to provide a relatively low color concentration upon which a color shift still exists to the human eye to thereby provide an additional level of security to the security document 51.

In summary connection with the present invention, by incorporating the multilayer interference thin film flakes into the polymeric film, it is possible to maximize the optical effect from the optical flakes and to minimize the amount of flakes which is required. This is important because the pigment flakes are relatively expensive in comparison to the cost of the polymeric film. Theoretically, the best optical performance can be achieved by having a single plane of the flakes with the flakes touching each other so that they are in effect a monolayer with minimum use of flakes. In practice, this optimum arrangement of the flakes is difficult to achieve because the polymeric sheet has a third dimension and thus the flakes may not lie in any single plane. Also there may be some overlapping of the flakes and some gaps in between the flakes. However, by orientation of the flakes in the polymeric sheet, as hereinbefore described optimum optical performance of the flakes is achieved. By utilizing relatively high temperatures in the extrusion process above approximately 250° C. the viscosity of the molten polymer is reduced. This permits the flakes to more readily orient in the desired manner hereinbefore described. In addition, by extruding and thereafter drawing the polymeric film so that it is very thin optimizes the distribution of the flakes. By utilizing a dark or black background, the viewer perceives an optical effect which is brighter than with a white background. By utilizing dyes in coextruded layers, it is possible to achieve still different optical effects. The polymeric sheet which is created in the present invention by casting or extrusion is very stable and durable.

What is claimed is:

1. A polymeric sheet comprising a first layer of polymeric material having first and second parallel surfaces, a plurality of multilayer interference thin film flakes disposed in the first layer of polymeric material, said flakes having first and second parallel surfaces and a width and a thickness and having an aspect ratio of at least 2:1 for the width with respect to the thickness, said flakes being oriented so that the flakes lie in planes with the first and second parallel surfaces of the flakes being substantially parallel to the first and second parallel surfaces of the first layer of polymeric material.

2. A sheet as in claim 1 together with a second layer of polymeric material adhered to said first layer, said second layer of polymeric material serving as a primary layer and said first layer of polymeric material serving as a secondary layer.

3. A sheet as in claim 2 wherein said flakes are optically variable.

4. A sheet as in claim 2 wherein said second layer is colored.

5. A sheet as in claim 2 wherein said first layer is amorphous.

6. A sheet as in claim 5 wherein said second layer is substantially crystalline.

7. A sheet as in claim 6 wherein said second layer of polymeric material has first and second parallel surfaces and wherein said first layer of polymeric material is disposed on the first surface of the second layer together with a third layer of polymeric material adhered to the second surface of the second layer, said third layer of polymeric material having a plurality of multilayer interference thin film flakes disposed therein, said flakes in the third layer being oriented so that the flakes lie in planes with the first and second parallel surfaces of the flakes being parallel to the first and second parallel surfaces of the third layer.

8. A sheet as in claim 1 which is extruded.

9. A sheet as in claim 1 which is cast.

10. A sheet as in claim 1 wherein said flakes are biaxially oriented.

11. A polymeric sheet comprising a polymeric substrate having first and second surfaces and forming a primary layer, a secondary layer of a polymeric material disposed on each of said first and second surfaces, said secondary layer having a plurality of oriented multilayer interference thin film flakes disposed in the second layer, said flakes having first and second parallel surfaces and a width and a thickness to provide an aspect ratio of at least 2:1 for the width with respect to the thickness, said oriented flakes lying in planes in the secondary layer with the first and second surfaces of the flakes being substantially parallel to the first and second surfaces of the secondary layer.

12. A polymeric sheet as in claim 11 wherein said primary layer and said secondary layer are coextruded.

13. A polymeric sheet as in claim 11 wherein said primary layer is crystalline and said secondary layer is amorphous.

14. A polymeric sheet as in claim 13 wherein both the primary and secondary layers are biaxially oriented.

15. A polymeric sheet as in claim 11 wherein the flakes are optically variable.

16. A polymeric sheet as in claim 11 wherein said primary layer is colored.

17. A polymeric sheet comprising a layer of polymeric material having first and second parallel surfaces, a plurality of oriented multilayer interference thin film flakes disposed in said layer of polymeric material, said flakes having first and second parallel surfaces and a width and a thickness to provide an aspect ratio of at least 2:1 for the width with respect to the thickness, said layer of polymeric material being biaxially oriented with the flakes lying in planes in the directions of the biaxial orientation with the first and second surfaces of the flakes being substantially parallel to the first and second surfaces of the layer, and an additional layer of polymeric material being disposed on each of the surfaces of the first named layer of polymeric material.

18. A polymeric sheet as in claim 1 wherein at least one of said second and third layers is colored.

19. A polymeric sheet as in claim wherein said first layer of polymeric material and said second and third layers of polymeric material are coextruded.

20. A security product, a sheet of material having first and second surfaces, an optical article carried by the sheet of material, said optical article comprising a layer of polymeric material having first and second parallel surfaces, a plurality of oriented multilayer interference thin film flakes disposed in the layer of polymeric material, said flakes having first and second parallel surfaces and a width and a thickness and having an aspect ratio of at least 2:1 for the width with respect to the thickness, the first and second parallel surfaces of the flakes lying parallel to the first and second surfaces of the layer of polymeric material.

21. A product as in claim 20 wherein said layer of polymeric material is biaxially oriented with the flakes lying in planes in the directions of the biaxial orientation with the first and second surfaces of the flakes being substantially parallel to the first and second surfaces of the layer.

22. A product as in claim 20 together with an additional layer of polymeric material adhered to the first named layer of polymeric material.

23. A product as in claim 22 wherein said additional layer of polymeric material is colored.

24. A product as in claim 15 wherein said flakes are optically variable.

25. A product as in claim 20 wherein said article is in the form of an elongate strip and wherein said strip is at least partially embedded in the sheet of material.

26. A product as in claim 25 wherein said strip has portions and wherein said portions are visually exposed through at least one surface of the security document.

27. A product as in claim 26 wherein said strip has additional portions and wherein said additional portions are visually exposed on the other surface of the sheet of material.

28. A product as in claim 20 together with a sheet carrying an image disposed on the first surface underlying the optical article and wherein the optical article is semi-transparent to permit viewing of the image through the optical article.

29. A product as in claim 20 together with at least one filler agent in the form of a dye or pigment incorporated in the polymeric material.

30. A product as in claim 29 wherein said dye or pigment is selected to block out an undesired color at various angles.

31. A product as in claim 26 wherein said polymeric material is in the form of either a biaxially oriented polymeric layer or a cast layer.

32. A product as in claim 31 together with a dye or pigment being disposed in the polymeric material.

33. A product as in claim 32 wherein said dye or pigment is selected to block out an undesired color at various angles.

34. A method for forming an optical product utilizing multilayer interference thin film flakes having first and second parallel surfaces and a width and a thickness and having an aspect ratio of at least 2:1 for the width with respect to thickness comprising melting a polymeric material, introducing the flakes into the polymeric material, forming the melted polymeric material into a molten mass with the flakes therein to cause the flakes to orient themselves in the molten mass as it is being formed into a sheet having first and second parallel surfaces so that the first and second surfaces of the flakes lie in planes parallel to the first and second parallel surfaces of the sheet and cooling the sheet to cause the same to solidify to form a sheet.

35. A method as in claim 34 including heating the cooled sheet and stretching the sheet in first and second directions to cause biaxial orientation of the molecular chains in the sheet and at the same time to cause orientation of the flakes so that they lie in planes in the directions of biaxial orientation and further cooling the sheet.

36. A method as in claim 34 together with coextruding the sheet with an additional layer of polymeric material so that the additional layer is adherent to the first surface of the sheet.

37. A method as in claim 36 together with the step of introducing a color into the additional layer of coextruded material.

38. A method as in claim 36 together with the step of coextruding another layer of polymeric material so that the other layer is adherent to the second surface of the sheet.

39. A method for forming an optical product utilizing multilayer interference thin film flakes having first and second parallel surfaces and a width and thickness and having an aspect ratio of at least 2:1 for the width with respect to the thickness comprising dissolving a polymer into a solvent, introducing the multilayer interference thin film flakes to the dissolved polymer, forming a polymeric sheet having first and second parallel surfaces by casting the dissolved polymer with the multilayer interference thin film flakes therein into a solidified polymer onto a releasable substrate, drawing the polymeric sheet so as to orient the flakes in the solidified polymer, removing the coated sheet from the releasable substrate, the first and second surfaces of the flakes lying in planes parallel to the first and second surfaces of the sheet.

* * * * *